Figure 1:
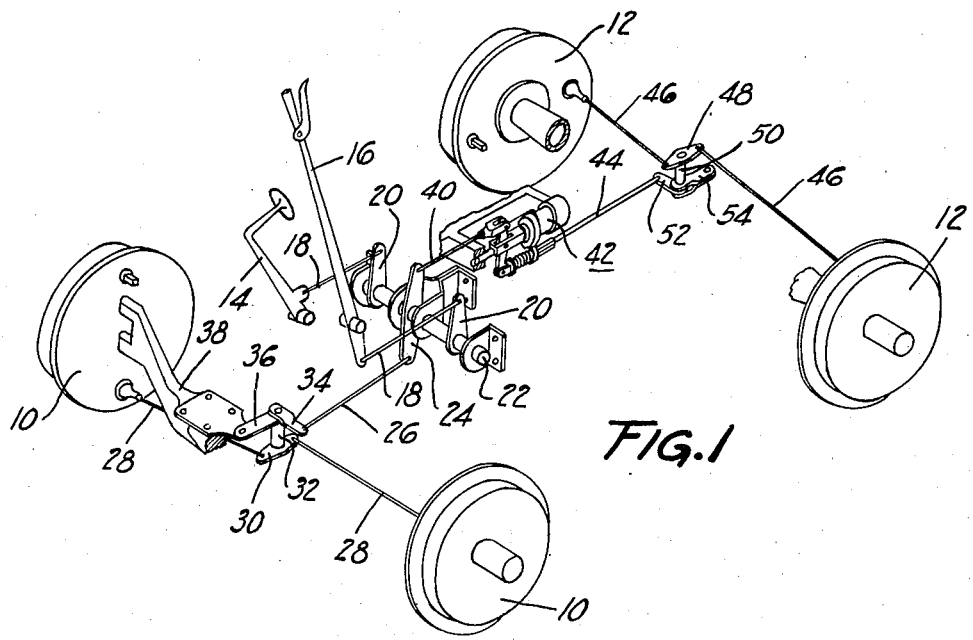

April 25, 1939.  G. P. ROBERTS  2,156,127

BRAKE

Filed Oct. 16, 1936

INVENTOR
GLYN PIERCE ROBERTS
BY
N. D. Parker, Jr.
ATTORNEY

Patented Apr. 25, 1939

2,156,127

UNITED STATES PATENT OFFICE 2,156,127

BRAKE

Glyn Pierce Roberts, Birmingham, England, assignor to Bendix Products Corporation, South Bend, Ind., a corporation of Indiana Application October 16, 1936, Serial No. 106,026
In Great Britain October 18, 1935

5 Claims. (Cl. 188—10)

This invention relates to brakes and more particularly to a method of and apparatus for varying the ratio of the applying force between the front brakes of a vehicle and the rear brakes thereof.

It has long been recognized as desirable to divide the braking load of a vehicle equipped with four wheel brakes equally between the front and rear brakes, as such a system gives very stable braking below certain limits and results in even brake lining wear.

The limits above which unstable braking results are determined by the shifting of the weight of the vehicle from the rear to the front wheels, caused by inertia forces during deceleration. This shifting of weight reduces the available traction of the rear wheels and consequently, with equalized brakes, the rear wheels slide whenever the braking effort equals the available traction.

In order to minimize this difficulty mechanical brakes are often arbitrarily set so that the front brakes exert a larger proportion of braking effort at all times, while hydraulic brakes are sometimes built with smaller wheel cylinders in the rear for a similar purpose.

Inasmuch as a large proportion, often more than 80%, of the use of vehicle brakes occurs when the braking effort is less than the limit above which equalized brakes would permit the rear wheels to slide, it is an object of my invention to provide a method of and apparatus for applying four wheel brakes equally until a certain braking effort is obtained and thereafter to proportion the effort between the front and rear wheels.

Another object is to provide operating means for the rear wheel brakes of a vehicle in which increasing force in a driver operated connection applies the brakes up to a predetermined limit and then releases them in proportion to the increase in force beyond that limit.

One desirable means of realizing the above objects is to provide a lever in the rear brake connection mounted on a floating fulcrum and having a connection from the driver operated pedal or lever at one end and a connection to the rear brakes at the other end. Yieldable means carried by the floating fulcrum prevents rotation of the lever until a force is exerted exceeding that at which it is desirable to have equalized brakes. Until this means yields, the two connections, the lever and its fulcrum move together in the same direction.

Upon the yielding of said means additional means acts to lock the fulcrum against further movement, and thereafter the lever rotates on the fulcrum moving the connection to the rear brakes in the opposite direction and thus partially releasing them in proportion to the continued movement of the driver operated connection.

Figure 2:
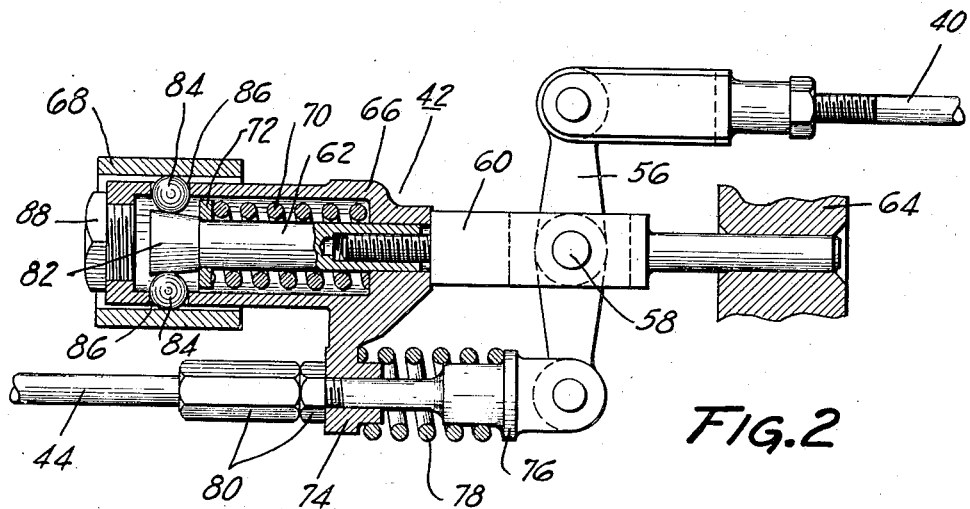

Other objects and desirable particular constructions will become apparent upon reference to the following detailed description of an illustrative embodiment of my invention shown in the accompanying drawing, in which:

Figure 1 is a partially diagrammatic view of a four wheel brake system embodying my invention; and Figure 2 is a longitudinal vertical section through one form of my novel control device.

The system of Figure 1 comprises a set of front brakes 10 and a set of rear brakes 12. A pedal 14 and a hand lever 16 are provided for alternative operation of the brakes. Both are connected by flexible cables 18 to arms 20 rigidly secured to a cross-shaft 22 journaled in brackets fixed to the vehicle chassis.

A cross-arm 24 secured at its center to the cross-shaft has a flexible cable 26 secured to its lower end and extending forwardly to operate the front brakes 10. Connections to these brakes may include a pair of cables 28 extending from the brake chambers to a point adjacent the center line of the vehicle where they are secured to opposite ends of a cross-arm 30 fixed on a vertical shaft 32.

The shaft 32 has another arm 34 to which the forward end of the cable 26 is secured. A link 36 pivoted on the front axle 38 provides a transversely movable bearing for the shaft 32 to equalize the forces applied to each of the front brakes.

A rod 40 extends toward the rear of the vehicle from the upper end of the cross-arm 24 and is secured to my novel control device 42 (to be fully described with reference to Figure 2) and a rod 44 extends from the control device to operate the rear brakes 12. The rear brakes are provided with transversely extending cables 46 connected to opposite ends of a cross-arm 48 or a vertical shaft 50 which has another arm 52 to which is secured the rod 44. The shaft 50 is mounted similarly to the shaft 32 on a link 54.

It is to be understood that any type of hookup accomplishing substantially the same purpose as the above might be employed; as determined by the type of brakes used, the construction of the chassis frame, and the disposition of other mechanical units thereon, such as the engine, transmission, etc.

Referring now to Figure 2 the rod 40 is shown connected to a lever 56 fulcrumed between its ends on a pin 58 secured in a plunger made up of two parts 60 and 62 adjustably threaded together. The forward end of the part 60 is slidably mounted in a bracket 64 secured to the chassis frame (not shown), while the part 62 is slidably mounted in a housing 66 which in turn slides in a sleeve 68 also secured to the chassis frame.

A coiled compression spring 70 is mounted in an annular space between the housing 66 and the plunger part 62 and has its forward end bearing against the housing and its rear end bearing on a washer 72 seated against a shoulder formed on the plunger part. A shoulder on the part 60 prevents relative movement of the part 62 and the housing 66 in the direction in which they are urged by the spring 70.

The housing 66 is provided with a projection 74 forming a bearing in which the rod 44 slides. Between this projection and a shoulder 76 formed on the rod 44 adjacent its connection to the lever 56, is a second spring 78 which may be identical with the spring 70. Jam nuts 80 adjustably positioned on the rod 44 provide a stop preventing relative movement between the rod and the projection 74 under the influence of the spring 78.

The rear end 82 of the rod is formed in a generally conical shape and seated thereon are a plurality of rolls 84 projecting through slots 86 in the housing 66 and just out of contact with the chassis mounted sleeve 68.

A plug 88 closes the end of the housing 66 but permits access to the end of the plunger part 62 which may be provided with a non-circular recess (not shown) adapted to receive an adjusting tool.

In operation, movement of either the pedal 14 or the lever 16 rotates the cross-shaft 22 applying the front brakes through the cable 26 and moving the rod 40 forwardly. Both of the springs 70 and 78 are provided with a predetermined initial tension which prevents relative movement between the lever 56 and the part 60 and between the housing 66 and plunger 62—60 and consequently all these parts are translated forwardly as a unit, sliding in the bracket 64 and the sleeve 68, and drawing the rod 44 forwardly to apply the rear brakes.

If, however, the applying force exceeds the initial force of the springs, the plunger 60—62 will move forwardly relatively to the housing 66, and the conical end 82 will force the rolls 84 outwardly against the sleeve 68, locking the plunger to the sleeve.

Thereafter continued movement of the rod 40 forwardly rocks the lever 56 about the fulcrum pin 58 and moves the rod 44 rearwardly, compressing the spring 78, and releasing the rear brakes in proportion to the movement of the rods.

The distances between the rods 44 and 40 and the fulcrum pin 58 may be so proportioned to give any desired relief to the rear brakes for a given movement of the rod 40.

Thus it will be seen that my invention provides equal action for all four brakes until a predetermined braking force is exerted on the connections, and that thereafter additional force is applied only to the front brakes while the rear brakes are relieved in any desired proportion.

While only one embodiment of my invention has been described in detail, it is to be understood that various modifications of form and arrangement might be made within the scope and spirit of the inventive idea, and consequently I do not intend to be limited by that embodiment or otherwise than by the terms of the appended claims.

What is claimed is:

1. A vehicle brake control device comprising a plunger axially slidable in a sleeve fixed to the vehicle chassis, a lever pivoted between its ends on the plunger, a driver operated connection on one end of the lever, a brake operating connection on the other end of the lever, a housing axially slidable on the plunger, opposed compression springs effectively interposed between the plunger and the housing, and the housing and said other end of the lever, and means for locking the plunger in the sleeve when the springs are compressed.

2. A vehicle brake control device adapted to be mounted on a vehicle chassis and comprising an axially movable plunger, a lever pivoted between its ends on the plunger, a driver operated connection on one end of the lever, a brake operating connection on the other end of the lever, spring means preventing rotation of the lever about its pivot until a predetermined force is exerted by said driver operated connection, and means for locking the plunger when said predetermined force is exceeded, said locking means comprising a conical end on said plunger, a series of rolls engaging said conical end and means for moving the rolls relatively to the plunger to cause the conical end to engage them with a part of the chassis.

3. A four wheel braking system comprising a driver operated member, a rigid connection from said member to the front brakes, an axially movable plunger, a lever pivoted between its ends on said plunger, a connection from the driver operated member to one end of said lever, a connection from the other end of the lever to the rear brakes, yieldable means preventing rotation of the lever until a predetermined force is exceeded, and means for locking the plunger when said predetermined force is exceeded.

4. A vehicle having brakes and an applying member having connections extending to said brakes and having a fixed member rigid with the chassis frame, one of said connections including a locking device operated upon a predetermined force being applied to said connection to lock a part of the connection to said fixed member and also including means actuated when said device is locked for changing the force applied through said connection to its brakes.

5. A vehicle having brakes and an applying member having connections extending to said brakes, one of said connections including a locking device operated upon a predetermined force being applied to said connection and also including means actuated when said device is locked for reducing the force applied through said connection to its brakes and thereby partially releasing said brakes.

GLYN PIERCE ROBERTS.